United States Patent [19]

Randelli

[11] Patent Number: 4,468,208
[45] Date of Patent: Aug. 28, 1984

[54] TRANSMISSION DEVICE

[76] Inventor: Pierre Randelli, 14 Avenue du Trayas, 13008 Marseille, France

[21] Appl. No.: 314,040

[22] Filed: Oct. 22, 1981

[30] Foreign Application Priority Data

Oct. 24, 1980 [FR] France ................................. 80 22974

[51] Int. Cl.³ .............................................. F16C 1/04
[52] U.S. Cl. ..................................... 464/117; 464/173; 464/178
[58] Field of Search ............... 464/114, 117, 125, 134, 464/136, 147, 173, 178; 403/26, 57, 58

[56] References Cited

U.S. PATENT DOCUMENTS

| | | | |
|---|---|---|---|
| 1,281,918 | 10/1918 | Ecaubert | 464/114 |
| 1,942,745 | 1/1934 | Coats | 464/117 |
| 2,193,552 | 3/1940 | Cotchett | 464/117 |
| 2,369,810 | 2/1945 | Stillwagon, Jr. | 464/134 |
| 2,501,217 | 3/1950 | Hawn | 464/114 |
| 3,122,901 | 3/1964 | Thompson | 464/117 |

FOREIGN PATENT DOCUMENTS

| | | | |
|---|---|---|---|
| 947768 | 8/1956 | Fed. Rep. of Germany | 464/117 |
| 346743 | 2/1905 | France . | |
| 400956 | 8/1909 | France . | |
| 155441 | 12/1920 | United Kingdom . | |

*Primary Examiner*—Stuart S. Levy
*Assistant Examiner*—Daniel P. Stodola
*Attorney, Agent, or Firm*—Sandler & Greenblum

[57] ABSTRACT

A flexible and deformable transmission device for use in transmitting torsion. The device includes two sets of elements, each including a cardan joint. Each of the element sets is held within a bearing.

10 Claims, 6 Drawing Figures

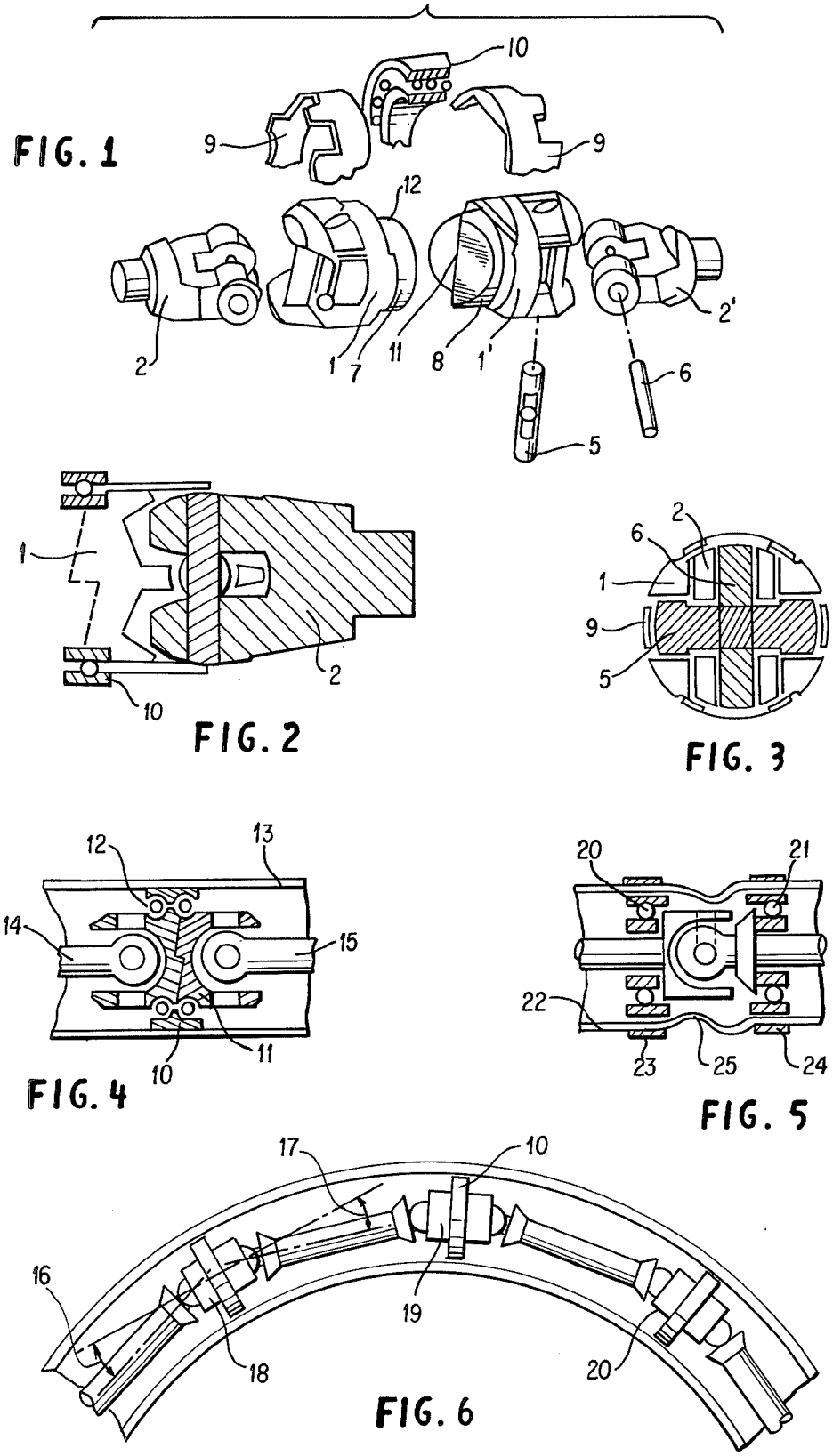

ed, without departing from the spirit of the invention.

TRANSMISSION DEVICE

BACKGROUND OF THE INVENTION

1. Field of the Invention

The invention relates to a flexible deformable transmission device having a variable angle of curvature.

2. Description of Prior Art

In known flexible transmission devices, one generally uses a cable turning in a spiralled sheath. However, the cable contacts a large surface area of its sheath or envelope, which causes heating and consumes substantial energy. Furthermore, in the numerous devices utilized, the extent of flexion is always limited, and the rigidity of the sheath diminishes its maneuverability. The cables undergo torsion and untwisting, resulting in an angular "delay".

Finally, such transmissions allow for only unidirectional rotation, and are limited in the extent of use.

SUMMARY OF THE INVENTION

The device according to the invention comprises a fractionated shaft made up of connected segments. The segments are connected to one another by a cardan-type joint so as to allow for the transmission of substantial rotational forces while attenuating and eliminating friction.

The device of the invention overcomes the disadvantages of the prior art, and allows not only for the flexible transmission of substantial rotational forces along maximum flexional curves and, if necessary, a small radius, but further assures, at the same time, good maneuverability; and a reduction of friction, avoiding the rapid wear in two directions of continuous rotation. The device of the invention further provides a strict and very responsive mechanical linkage without substantial angular delay.

The device of the invention comprises a shaft fractionated into rigid segments, which are connected to one another through cardan joints without contact with the interior of the flexible sheath, and centered along the axis thereof by means of ball bearings, which give it structure.

BRIEF DESCRIPTION OF THE DRAWINGS

The annexed drawings illustrate, by way of nonlimiting example, one of the embodiments forming the object of the invention, in which:

FIG. 1 is a perspective view, with cut-away portions, of the element assembly constituting the device;

FIGS. 2 and 3 are longitudinal and transverse cross-sectional views of the joints, respectively;

FIG. 4 is a cross-sectional elevational view of the joint mounted in a sheath; and FIG. 5 illustrates an alternative embodiment of the joint shown in FIG. 4; and FIG. 6 illustrates a flexible transmission device which includes the jointed transmission element assembly illustrated in FIG. 1.

DESCRIPTION OF PREFERRED EMBODIMENTS

The device includes pairs of element sets arranged in series. The elements of the sets forming the device of the invention are shown in FIG. 1. Elements 1, 2, 1', and 2' may be made of synthetic resin, metal, or any other appropriate material. Axial pins 5 and 6 are made of metal. Axial pin 5 turns in the bearings of element 1, and pin 6 turns in the bearings of a forked portion of element 2. The axial pin or shaft 5 is provided with flattened portions at its central portion such that the two planar surfaces are in contact with internal planar surfaces of the fork of element 2. Axial pin 5 likewise contains a bore in its central portion having the diameter of axial pin 6, which is immobilized at its middle, and secured by a tight fit. The geometrical axis of axial pin 6 is exactly orthogonal to the geometrical axis of pin 5.

Elements 1 and 1', which are journalled with elements 2 and 2', respectively, by virtue of pins 5 and 6, fit, at their ends of smaller diameter 7 and 8, in ring 9, which closely encases elements 1 and 1' and 2 and 2'. The rings extend just beyond connecting segments 7 and 8. These rings are made of steel, and serve to secure and position pin 5 and ring the elements 1 and 1', while reinforcing it at the junction point.

This assembly constitutes a cardan joint reinforced by the ring. The connecting segments are force-fitted in bearing 10. The support faces 11 and 12 abut one another over large contact surfaces, and transmit an elevated force couple in the two directions of rotation.

The four elements 7, 8, 9, and 10 are tightly integrated and stabilized after special treatment, as shown in FIG. 4, and only the ball bearing 10 will be in contact with the outer sheath 13.

This assembly is completed by intermediate shafts 14 and 15, situated between two cardans assembled by a double-hook joint having attachment ridges 11 and 12.

During flexion of the sheath, the median bearing is the only fixed support point. Angles formed by the segments juxtaposed with this short intermediate axis equalize and equilibrate. This results, by virtue of the elasticity of the flexible sheath or of its constituent portions. As a result of this force, the intermediate shaft orients itself such that the angles which it forms with the two shaft segments by means of the two cardan joints are equal. The transmission of the rotational movement is very substantially homokinetic.

According to an alternative embodiment shown in FIG. 5, the bearings 20 and 21 are positioned to surround the sheath 22 from the outside by means of rings 23 and 24 between two deformable or flexible segments 25 in what may be an otherwise relatively inflexible sheath.

FIG. 6 illustrates the invention as shown in the previous FIGS. 1-4 and as it is homokinetically flexed. More specifically, FIG. 6 of the invention illustrates the bearings in a flexible transmission line in which a plurality of rods 16, 17, e.g., are connected by bearing elements 18, 19, and 20, e.g. As illustrated in this figure, the connection between the jointed members provides for the device to be homokinetically flexed over a variety of different angles.

The transmissions by cables in combination with cardan joints 1 and 2 and ball bearings 10 find use in industrial, domestic, and professional equipment, as well as in agricultural and specialized equipment. The device of the invention does not require rigorous alignment, and allows for orientations at variable angles and maximum curves, without friction which results in diminution of the force and the power transmitted.

Although the invention has been described with respect to particular means and embodiments, it is to be understood that the invention is not limited to the particulars disclosed. Thus, the shapes, dimensions, and arrangements of the various elements can be varied, with equivalents being substituted, without going beyond the scope of the invention. Likewise, the materials out of which the elements are formed can be changed without going beyond the scope of the invention as defined by the claims.

What is claimed is:

1. A flexible transmission device capable of use along different angles of curvature, said device comprising:
    (a) at least two joint mountings, each of said mountings comprising two pairs of elements, each pair of elements having an outer element pivotally connected to an inner element, each inner element having a reduced diameter and portion terminating in an attachment ridge, the ridges of each pair of elements having symmetrical configurations which are adapted to mate with each other;
    (b) bearing means positioned about said ridges when said ridges are mated;
    (c) a single flexible sheath positioned about all of said bearing means; and
    (d) a single, jointless rod for attaching two adjacent mountings, wherein said mountings and said rods together comprise means for flexing said device homokinetically over a variety of different angles.

2. The transmission device as defined by claim 1, wherein said bearing means are fixed relative to said sheath while said pairs of elements are free to rotate relative to said sheath.

3. The transmission device as defined by claim 1 wherein each pair of elements comprises a cardan joint and comprises two orthogonal pins.

4. The transmission device as defined by claim 3 wherein one of said pins comprises a flattened central portion adapted to fit within a forked portion of said inner element of each element pair.

5. The transmission device as defined by claim 4 wherein said pin comprising said flattened portion further comprises a bore traversed by the other of said orthogonal pins.

6. The transmission device as defined by claim 1 wherein each bearing means comprises a plurality of ball bearings in each of said inner elements which is forced fitted within said bearing means.

7. The transmission device as defined by claim 1 wherein the outer element of each pair of elements comprises a forked portion and a shaft extending from said forked portion, each inner element also comprising a forked portion at one end thereof.

8. The transmission device as defined by claim 1 wherein said bearing means secures a ring on each side of said bearing means, each of said rings surrounding and securing at least a portion of a respective inner element.

9. The transmission device as defined by claim 1 wherein said bearing means comprises two sets of outer rings and wherein said device is secured within a sheath with said sheath clamped between each of said outer rings.

10. The transmission device as defined by claim 9 wherein said sheath is flexible between each of said two sets of outer rings associated with corresponding element pairs.

* * * * *